United States Patent [19]
Ide et al.

[11] Patent Number: 5,344,725
[45] Date of Patent: Sep. 6, 1994

[54] SEALED LEAD ACID STORAGE BATTERY

[75] Inventors: Masayuki Ide; Takashi Nakajima, both of Toyohashi; Yoichi Kikuchi, Tokyo; Kenji Kobayashi, Toyohashi, all of Japan

[73] Assignee: Matsushita Electric Industrial Co., Ltd., Osaka, Japan

[21] Appl. No.: 2,838

[22] Filed: Jan. 15, 1993

[30] Foreign Application Priority Data

Jan. 21, 1992 [JP] Japan .................. 4-008237

[51] Int. Cl.$^5$ ............... H01M 6/42; H01M 10/12; H01M 2/02
[52] U.S. Cl. ............................. 429/160; 429/159; 429/161; 429/178
[58] Field of Search ............ 429/178, 153, 158, 160, 429/161, 99

[56] References Cited

U.S. PATENT DOCUMENTS

| 1,802,801 | 4/1931 | Willard . | |
|---|---|---|---|
| 1,829,935 | 11/1931 | Klock | 429/179 X |
| 3,207,634 | 9/1965 | Wilkinson . | |
| 3,457,119 | 7/1969 | Tench | 429/159 X |
| 3,623,917 | 11/1971 | Chassoux | 429/99 |
| 4,563,402 | 1/1986 | Kobayashi et al. . | |
| 5,017,441 | 5/1991 | Lindner | 429/159 X |
| 5,140,744 | 8/1992 | Miller | 429/99 X |

FOREIGN PATENT DOCUMENTS

| 0251970A1 | 1/1988 | European Pat. Off. . |
|---|---|---|
| 3112512A1 | 2/1982 | Fed. Rep. of Germany . |
| 525712 | 9/1940 | United Kingdom . |
| 680739 | 10/1952 | United Kingdom . |

*Primary Examiner*—John S. Maples
*Attorney, Agent, or Firm*—Stevens, Davis, Miller & Mosher

[57] ABSTRACT

The present invention relates to a sealed lead acid storage battery comprising a multi-cell type monoblock battery container comprising cell chambers in each of which groups of electrode plates of the same shape are contained, and the positive and negative electrode poles at the upper portions of the groups of electrode plates are all arranged on the same side of cell chambers. Especially, all of the positive and negative electrode poles at the upper portions of the groups of electrode plates in the monoblock battery container, in which the cell chambers are arranged in two parallel rows, are arranged on the same side near the central partition, and the electrode poles of adjacent cell chambers are connected by cell connectors which cross over the partitions between the adjacent cell chambers in the battery container.

4 Claims, 4 Drawing Sheets

SEALED LEAD ACID STORAGE BATTERY

BACKGROUND OF THE INVENTION

The present invention relates to an improved structure of sealed lead acid storage battery which makes it possible to produce the battery with a high rationality and reliability, and more particularly, to an improved structure of a sealed lead acid storage battery comprising a battery container, a plurality of cells of the same shape arranged in one row or two parallel rows in the container and groups of electrode plates arranged in each of the cells, in which the leading electrode poles of the groups of electrode plates are positioned on the same side of the cells in each of the rows of cells, and to an improved structure of a lid for the container including the output and input terminal system.

The arrangement of groups of electrode plates in a multi-cell chamber type monoblock battery container for conventional sealed lead acid storage batteries wherein the respective cells are arranged in two rows parallel to each other, will be explained below referring to FIG. 1.

As shown in FIG. 1, groups of electrode plates 1 are contained in each cell chamber 3 of battery container 2. The cells containing the groups of electrode plates 1 are arranged in the order of cells I–VI turning at III and IV and are connected by connectors 4 in such a manner that they are totally connected in the U-shaped form. On the other hand, the electrode poles 6 of the groups of electrode plates 1 for respective output and input terminals 5 and 5' are positioned outwardly both in end cells I and VI at the right end as shown in FIG. 1. In the batteries of this sort the output and input terminals 5 and 5' for the positive and negative electrodes are arranged at the positions near both the end portions in the upper part of the battery in relation with apparatuses in which it is used. Because of such a structure, the groups of electrode plates 1 contained in the respective cells arranged in two rows in the monoblock type battery container 2 require two shape types of the groups, A and B, as shown in FIG. 1, which are different in the structure of providing the positive and negative electrode poles 6 of the respective groups of electrode plates. The requirement of the two types of groups of electrode plates for one sealed lead acid storage battery causes increase in the number of elements for fabrication of battery, especially for assembling the groups of electrode plates in the battery and the number of steps for fabrication and in addition involves a high possibility of producing defective batteries owing to the risk that the positive and negative electrodes are erroneously inversely assembled or the shape type of the groups of electrode plates are confused.

Furthermore, in the case of the respective cells of the battery being connected by cell connectors 4 in one row in the order of I–III as shown in FIG. 2, the electrode poles 6 of the groups of electrode plates 1 for the output and input terminals 5 and 5' are positioned at the same side in the left and right end cells I and III of the battery. This case also requires a plurality of types of the groups of electrode plates and, as mentioned above, there are the problems of increase in the number of elements for fabrication of batteries and the number of elements-assembling steps for fabrication, so that production of defective batteries may occur.

On the other hand, output and input terminals 5 and 5' of a battery are usually welded just above the electrode poles 6 and are connected in the form of an extended electrode pole, and the indented portions of a lid are filled with an adhesive, so that the surrounding of the welded portion is protected with the adhesive to integrate with the lid and to seal the battery. However, in the case of such a structure, the distance of the output and input terminals 5 and 5' from the electrode poles 6 are short, and when a mechanical force is applied in connecting to or releasing from an external apparatus used, a sulfuric acid electrolyte permeate along the electrode poles 6 and enters the back side of the output and input terminals 5 and 5', which causes immediate corrosion of the terminals. Therefore, U.S. Pat. No. 4,563,402 proposed to improve the structure per se of the output and input terminals, thereby reducing the mechanical force applied to adhesive 7. However, this proposed structure of the output and input terminals is complicated, which causes the elements for fabrication of batteries to be complicated or the number of assembling steps for fabrication to increase.

FIG. 3 shows a cross-sectional view of a part of conventional monoblock battery container 2 and lid 8 when the container and the lid were fixed to each other with an adhesive. The container comprises cells containing the groups of electrode plates 1 assembled therein in the assembling steps before fixing with adhesive 7, and the cells are connected by the connectors 4. The lid 8 has groove 9 provided along the periphery thereof in which the periphery of the opening of the battery container is fitted. In integrating the lid 8 and the battery container 2, the portions in which the adhesive 7 is charged are four corners (not shown in FIG. 3) and pots such as reservoirs (also not shown in FIG. 3) into which the connectors 4 are fitted, which both are provided in the inside of the lid. The adhesive flows into the whole of the groove 9 communicating with these portions.

SUMMARY OF THE INVENTION

The object of the present invention is to provide an improved structure of a rational sealed lead acid battery with high reliability, which is characterized by comprising a plurality of cells of the same shape in two rows arranged therein, i.e., a multi-cell type battery container, in which the electrode poles of groups of electrode plates arranged in the cell chambers are positioned on the same side of the cells in each of the rows of cells, and to a structure of output and input terminals and a structure of lid suitable for completing the above-mentioned sealed lead acid storage battery.

In accordance with the present invention, the groups of electrode plates are of the same shape, so that the positive and negative electrode poles of the groups of electrode plates at the upper portions thereof both can be positioned on the same side in the respective cell chambers of a monoblock battery container. Thus, the shape type of the groups of electrode plates used in fabricating the batteries is unified so that no confusion occurs on the arrangement of polarity of the poles in putting the groups of electrode plates in the cell chambers. Especially, according to the present invention, the positive and negative electrode poles are provided at the upper portion of the groups of electrode plates in a monoblock battery container comprising the cell chambers in two rows which are parallel to each other. The electrode poles all are arranged at the same side of cells in the vicinity of the central partition between the two rows of cells. The electrode poles of the adjacent cells are connected by cell connectors which cross over the partition between the adjacent cells in the battery container. Furthermore, in integrating the lid and the battery container, the connecting distance between cells in the battery can be shortened and the number of steps of charging the adhesive can be diminished by fixing totally four electrode poles with the adhesion in one pot for charging the adhesive provided on the inside of the lid. Moreover, a leading plate, which is an output or input terminal, partially has hollows (perforated) and is placed on projections provided in the indented portion of the terminal leading parts on the surface of the lid and one end of the leading plate for the terminals is welded or calked to the electrode pole and the greater part of the leading plate excluding the externally connecting portion is embedded in the adhesive filled in the indented portion.

DESCRIPTION OF THE INVENTION

Details of the present invention will be explained referring to the examples shown in FIGS. 4–11.

Figure 1:
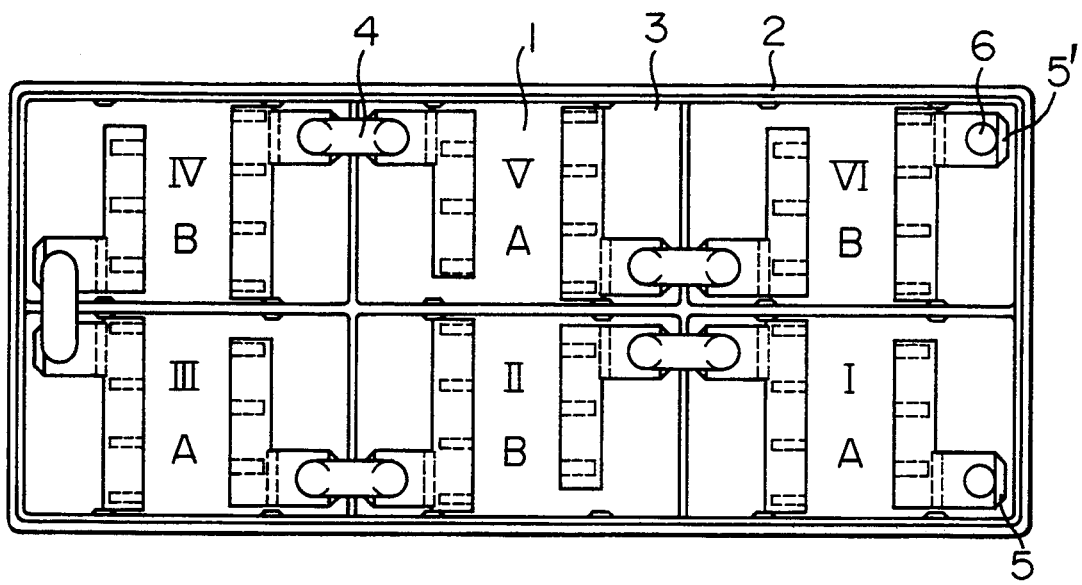
FIG. 1 is a top view of a conventional battery comprising a monoblock battery container in which cell chambers are arranged in two parallel rows where the groups of electrode plates are contained.
Figure 2:
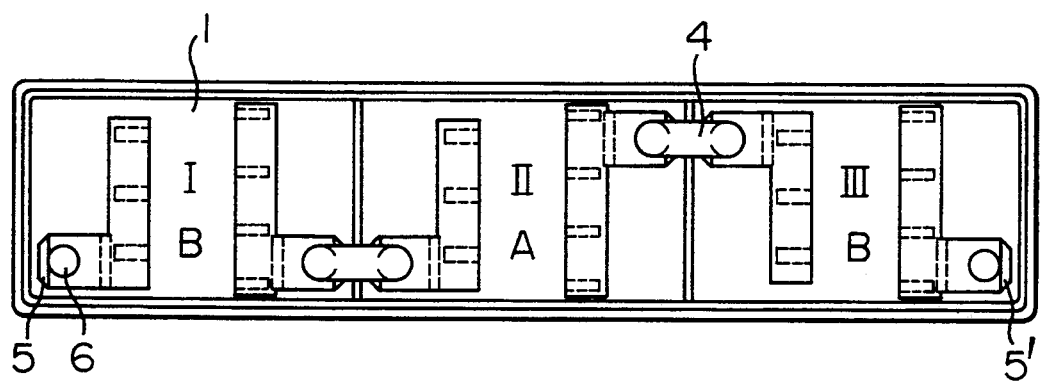
FIG. 2 is a top view of a conventional battery comprising a monoblock battery container in which cell chambers are arranged in one straight line where electrode plate groups are contained.
Figure 3:
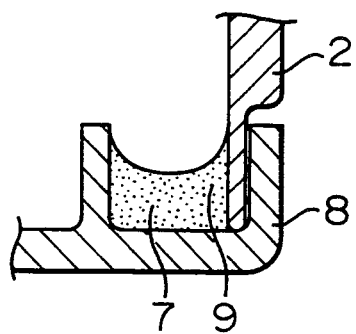
FIG. 3 is a cross-sectional view showing a conventional structure of a lid and a monoblock battery container which are integrated.
Figure 4:
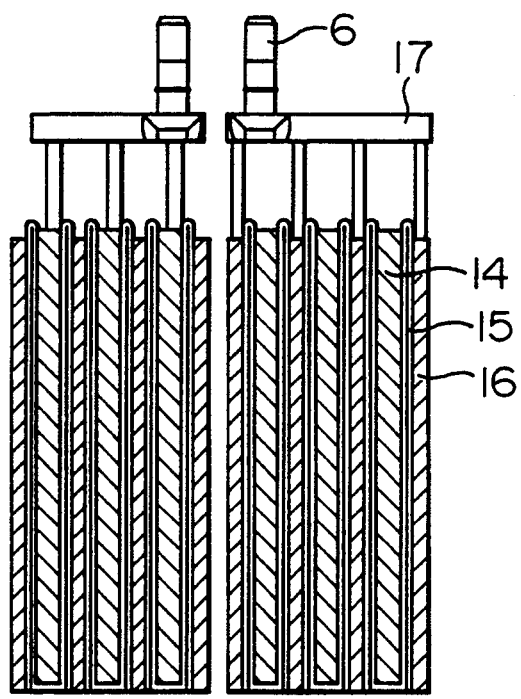
FIG. 4 is a side view of the group of electrode plates used in the present invention.
Figure 5:
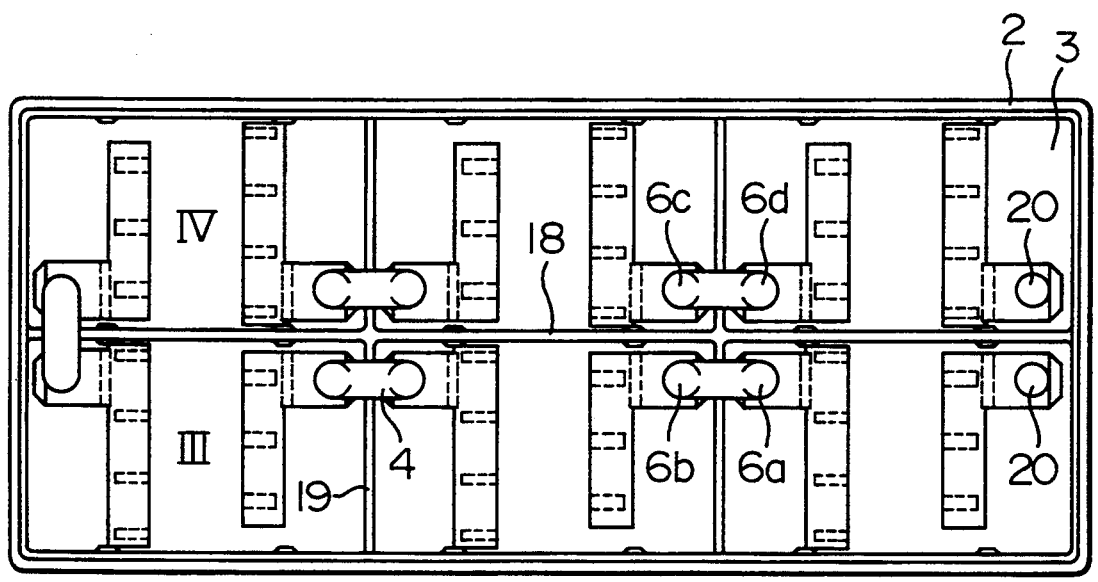
FIG. 5 is a top view of the battery of the present invention comprising a monoblock battery container in which cell chambers are arranged in two parallel rows and the groups of electrode plates are contained.

FIG. 4 shows the state of the groups electrode plates before inserted in the monoblock battery container 2 in which a plurality of cell chambers are arranged in two parallel rows. The group of electrode plate 1 is composed of positive electrode plates 14, separators 15 and negative electrode plates 16. As the grid which forms the positive and negative electrode plates there may be used so-called antimony-free lead alloy containing about 0.09 wt % of calcium and about 0.8 wt % of tin. As separator 15 of recent sealed lead acid storage batteries, a nonwoven fabric mat made of glass fibers of less than 5 microns in diameter is used from the points of wettability with electrolytes and water retention. There is a method of making batteries by inserting a separator comprising only a frame between the positive electrode plate and the negative electrode plate and injecting a gel electrolyte into the space between the plates. In the lead acid storage battery of this kind in which the amount of electrolyte in the cell must be controlled, the electrode plates are previously subjected to formation and after fabricating the battery the electrolyte is poured and then a relatively simple initial charging is carried out. However, recently, for rationalization of the formation process, there has been increasingly employed the method which comprises fabricating the groups of electrode plates using electrode plates which have not yet been subjected to formation, fabricating a battery with these groups of electrode plates, and then pouring the electrolyte to effect the formation in the battery container. Therefore, a nonwoven fabric made of glass fibers is used as separator. The groups of electrode plates 1 are produced by forming strap 17 by welding electrode plates of the same polarity and welding the pole 6 to the strap 17. A lead alloy containing about 2.5 wt % of tin is used for the strap 17 and the pole 6. Hitherto, the positive and negative electrode poles have been provided on the diagonal of cell chamber or at the central portion of cell chamber for obtaining a uniform flow of electric current, but, on the other hand, in the present invention the positive and negative electrode poles 6 are provided on the same side of cells at the outer side of the strap. There are seen no problems in providing both the electrode poles at this position as compared with conventional methods for production of small type batteries. The positive and negative electrode poles 6 of these groups of electrode plates are contained in the respective cells in such a manner that they are parallel to the longer side wall of the monoblock battery container 2 in which the cell chambers 3 are arranged in two parallel rows and they face the partition 18 positioned at the center of the battery container (FIG. 5). That is, the cells containing the groups of electrode plates and arranged in two rows in the monoblock battery container are electrically connected in such a manner that they are in the U-shaped form turning at III and IV cells. The adjacent cells are connected by connecting the electrode poles 6 having different positive and negative polarities above the partition 19 in the battery container 2 by cell connector 4 made of a tin-containing lead alloy. In the above case, the cell connector 4 is used, but it is also possible to connect the adjacent cells by bending the electrode poles 6 over the partition and contacting and welding the opposing bent poles. As a result, all of the connected electrode poles 6 present in the battery container face the partition 18 positioned at the center, and both the electrode poles 20 (of the same shape as that of poles 6) at the both ends (right end) are present at the center of the short side wall (right end wall) of the battery container.

Figure 6:
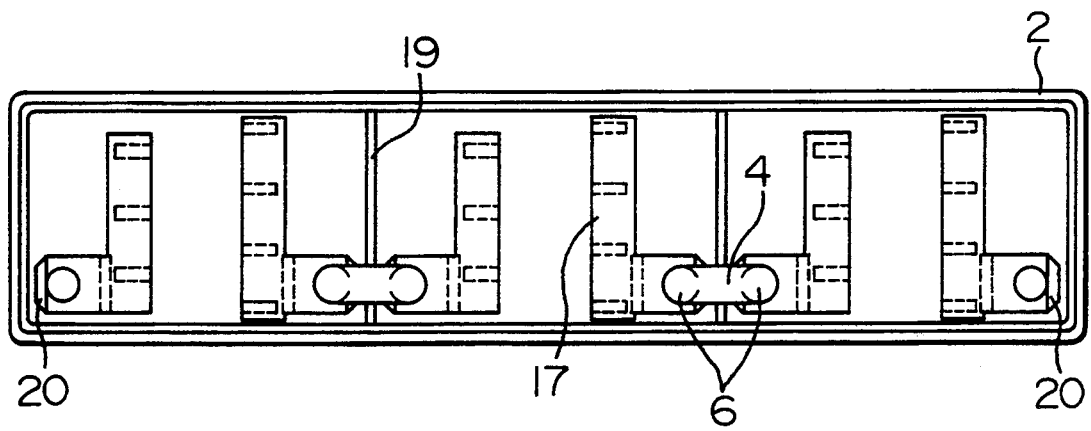
FIG. 6 is a top view of the battery of the present invention comprising a monoblock battery container in which cell chambers are arranged in a straight line and the groups of electrode plates are contained.

In the case of a monoblock battery container in which the cells are arranged in a row, when groups of electrode plates having the positive and negative electrode poles 6 provided at the outer side of strap 17 and in the same direction are placed in cell chambers 3 as shown in FIG. 6, the cell connectors 4 are present in the corresponding portions along the longer side wall of the battery container 2 and the electrode poles having different polarities in adjacent cells are connected over the partition 19 which crosses at right angles with the longer side wall. As a result, the positive and negative electrode poles 20 at the left and right ends are present in the corners at the same longer side wall of the monoblock battery container. The monoblock battery container 2 used for this sealed lead acid storage battery is generally made of ABS resins and an epoxy resin adhesive is used for integration with the lid 8. The electrode plate groups 1 must be used under application of a given pressure in the battery container 2 and the water retention of the groups of electrode plates to obtain a stable life and for this purpose, ribs are provided in the cell chambers from the top to the bottom for easy setting of the group of electrode plates therein. Through the space formed by the ribs, an oxygen gas generated from the positive electrode plates during the charging diffuses and is absorbed by the active material of the negative electrode plates which are the end plates of the groups of electrode plates. Thus, a sealed structure can be obtained.

When groups of electrode plates are placed in the monoblock battery container containing the cell chambers arranged therein which are in two parallel rows and electrically connected in such a manner that they are in the U-shaped form turning at the III-IV cells, both the end electrode poles are present at the same one shorter side wall (the right side wall). As a result, the four negative electrode pole 6a of the group electrode plates in the cell I, positive electrode pole 6b in the cell II, negative electrode pole 6c in the cell V and positive electrode pole 6d in the cell VI gather at one portion via the partitions of the battery container. Similarly, the negative electrode pole of the electrode plate group in the cell II, the positive electrode pole in the cell III, the negative electrode pole in the cell IV and the positive electrode pole in the cell V gather at one portion via the partitions of the battery container. Here, explanation is made of the battery comprising six cells, but a state of similarly easy operation can be obtained by employing such construction of groups of electrode plates in a mono-block battery container in which cells are arranged in two parallel rows.

Figure 7:
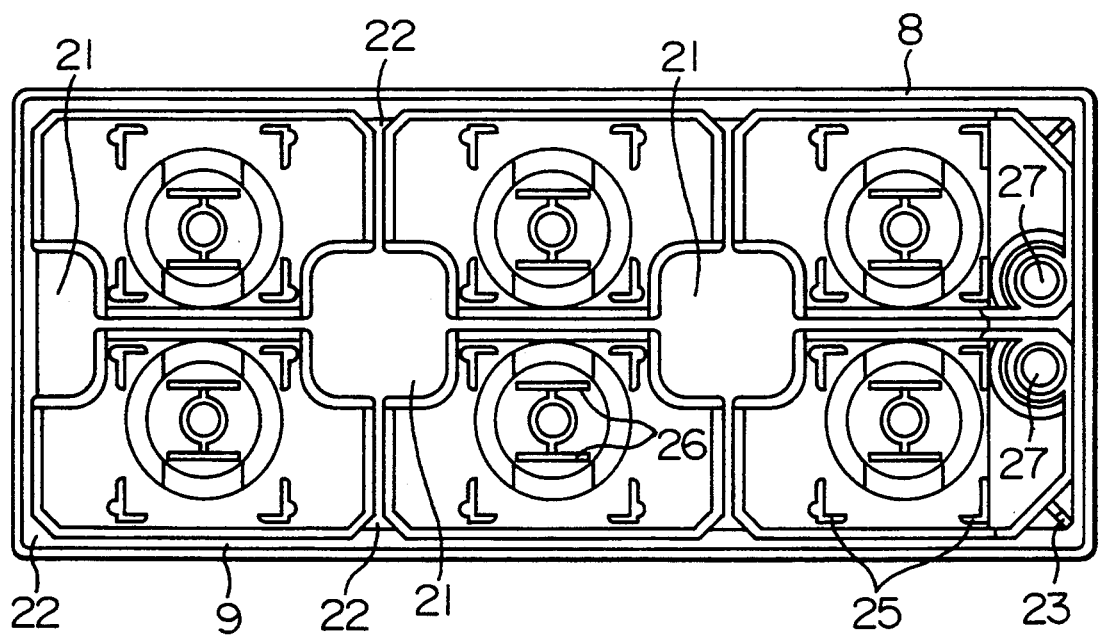
FIG. 7 shows the inside of a lid which is applied to the monoblock battery container shown in FIG. 5.
Figure 8:
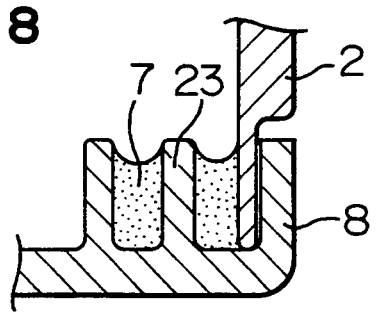
FIG. 8 is a sectional view of an enlarged portion which shows the integrated lid and monoblock battery container according to the present invention.

Next, structure of the lid used in this battery container will be explained. As shown in FIG. 7, groove 9 in which an adhesive used for integrating the lid with battery container 2 is filled is provided at the inside of lid 8 along the respective side walls and the partitions of the battery container. Pots 21 in which the cell connectors 4 connected over the partition 19 are to be fitted are provided at a part of the inside of the lid corresponding to the partition. When the lid 8 is turned inside out and an adhesive is poured in the groove 9 as shown, the adhesive is poured in the portion of the groove of relatively wide area so that the adhesive naturally flows through the portion of narrow width to reach the whole groove. In order that the adhesive is rapidly charged in the whole groove in this way, portions 22, which constitute part of the groove but are wider in their area than the groove, are provided at the portions communicating with the pot to be fitted with cell connector 4 and in the four corners of the outer periphery of the groove. In order to prevent the charged adhesive from moving by capillary phenomenon in this widened portion of the groove at the corners and to prevent the height of the central portion from lowering, partitioning projection 23 molded integrally with lid 8 is provided in the widened portion 22 as shown in FIG. 8. Providing this projection is also effective in the case of arrangement of cells in one row. However, when the battery container in which the cells are arranged in two rows is used, the distance of the whole groove through which the adhesive flows is long and hence the projection is further effective for shortening the flowing time and for feeding the adhesive in a stable amount to the groove.

Figure 9:
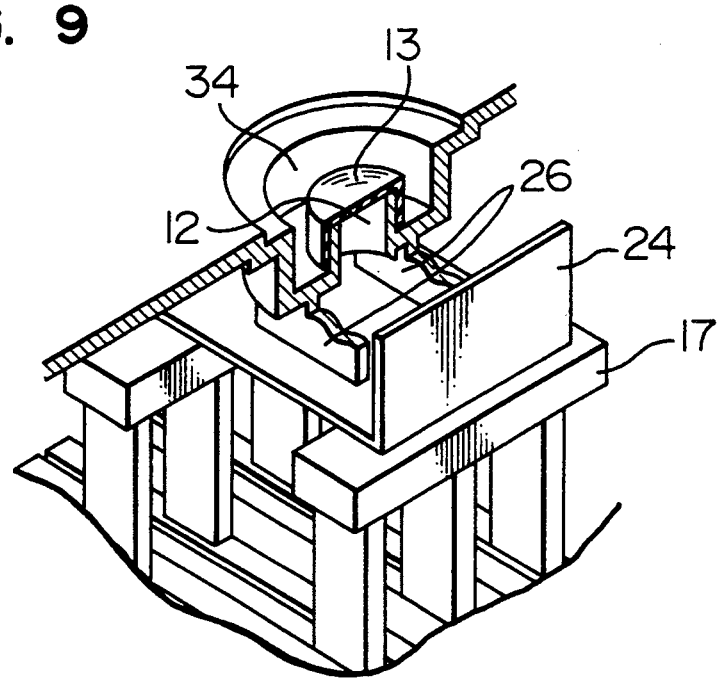
FIG. 9 explains a splash proofing paper provided between a strap of the group of electrode plates and the lid.

As shown in FIG. 9, splash proofing paper 24 is bent at both the ends in the U-shaped form and fitted and applied to projection 25 of a holder for the splash proofing paper provided inside of the lid 8 and the bottom of the U-shaped splash proofing paper is positioned above strap 17 when it is integrated with the battery container. The splash proofing paper holder 25 is in the form of a projection for solving the problems that when it is integrated with the battery container, the adhesive in the groove overflows and the splash proofing paper absorbs the adhesive which flows over the whole inside of the lid to narrow the electrolyte pouring port to disturb the pouring of the electrolyte and thus a long time is required for pouring the electrolyte. Width of this splash proofing paper 24 is smaller than that of the cell. This is for attaining easy flowing of electrolyte between the splash proofing paper 24 and the cell in pouring the electrolyte into the cell utilizing exhaust port 12 provided at the lid. A nonwoven fabric mainly composed of glass fibers is used here, but the material is not especially limited and synthetic resins may be used. Furthermore, there are suspended two splash proofing plates 26 in parallel which are integrated with the lid in the vicinity of exhaust port 12 crossing at right angles with the sidewall of splash proofing paper 24 which is bent in the U-shaped form. As a result, the four faces around the exhaust port 12 are covered with splash proofing paper 24 and splash proofing plate 26 to form a splash proofing structure.

Figure 10:
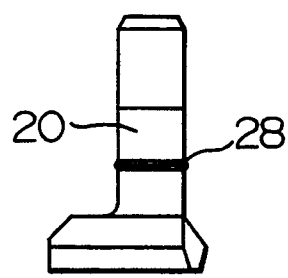
FIG. 10 is a front view of the positive and negative electrode poles of the present invention.

As the adhesive, a thermosetting epoxy resin is used and this is charged in groove 9 and the groove is fitted with the battery container. Then, the battery container is left to stand for 1 hour in an atmosphere of about 60° C., whereby the lid and the battery container are allowed to adhere to each other and integrated. When a ring-like projection 28 having nearly the same diameter as of the lid hole 27 is provided as shown in FIG. 10, this portion is firmly fitted in integrating the lid and the battery container and the positive and negative electrode poles 20 at the both ends which are outwardly led through the lid holes 27 can be led out at the center of the holes 27.

Figure 11:
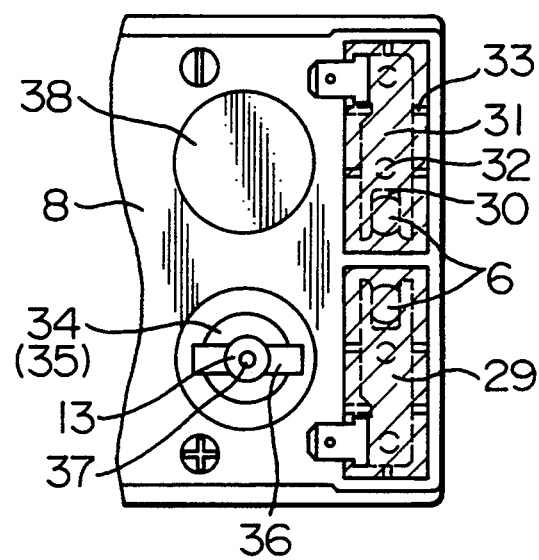
FIG. 11 is a top view which shows the structure of the output and input terminals according to the present invention.

When the lid and the battery container are integrated and then the battery is reversed and is positioned in the normal state, two shallow indented portions 29 in the form of a rectangle are provided at the portions on the surface of the lid at the shorter wall side which correspond to the positive and negative terminals and the two lid holes through which the electrode poles 6 pass are arranged in the indented portions with gathering at the center of the monoblock battery container 2 in which the cell chambers are arranged in two parallel rows. The electrode poles 6 at both ends which pass through the lid holes are fitted with O-rings made of chloroprene to completely separate and seal the lid and the electrode pole. To the electrode poles at the both ends is welded one end of tabs 31 which are output and input terminals and are made of brass plated with solder. The tabs are arranged in the width direction of the respective cell and the ends of the output and input terminals are led out from the side opposite to the positions of the electrode poles. As shown in FIG. 11, the tabs 31 have hollow portions 32 such as holes so that the adhesive is sufficiently charged in the peripheral portion and projections 33 on which the tab is placed are provided at the bottom of the indented portions of the lid and thus, the adhesive sufficiently flows into the underside of the tabs 31. As the adhesive, epoxy adhesives are used and it is convenient in actual use to add a colorant depending on the polarity of the terminal to the adhesive. In the case of using the battery container in which the cells are arranged in one row, the electrode poles at both ends are present in the corners at the longer side wall, but the similar construction can be obtained when the indented portions are arranged along the both shorter side walls.

Furthermore, the lid 8 has indented portions 34 corresponding to the respective cells on the surface and cylindrical exhaust port 12 which opens in the cell is provided in the indented portion 34. At the bottom of the indented portion excluding the part where the exhaust port 12 is provided there is provided a ring-like absorbent paper 35 which absorbs the electrolyte leaking from the exhaust port in actual use to prevent the electrolyte from flowing out of the battery. The electrolyte is poured into the cell chamber through this exhaust port 12. When the inner diameter of the exhaust port is small, namely, less than 10 mm, replacing the air therein with the electrolyte is difficult and pouring of the electrolyte is substantially impossible and in this case, the electrolyte is poured while discharging the air in the cell chamber. For this purpose, a double pipe having integrally an electrolyte pouring pipe and a vacuum exhaust pipe is stuck fast to the exhaust port, thereby simultaneously effecting the exhaustion and the pouring of the electrolyte. The exhaust port 12 the outside of which is coated with a silicone oil which stabilizes the working of safety valve 13 over a long period of time is covered with a cap-like safety valve 13 made of chloroprene after pouring the electrolyte. During formation in the battery container, a large amount of gas is generated by electrolysis of dilute sulfuric acid and the upper part of this safety valve is pressed by resin plate 36 the corner of which is integrated with the lid by ultrasonic welding in order to inhibit separation of safety valve 13 when the generated gas is discharged from the exhaust port 12. Furthermore, by making hole 37 in the portion with which the safety valve contacts, the portion of the safety valve which corresponds to the upper part of the exhaust port 12 dents because the oxygen gas in the cell chamber is absorbed by the negative electrode and the pressure in the cell is reduced. Thus, abnormality of the cells can be easily found at the subsequent steps. Above the resin plate, top cover 38 is integrated with the lid 8 by ultrasonic welding so that the top surface of the battery is flatted.

For effecting the formation in the battery container of a sealed lead acid storage battery, concentration of the electrolyte at the time of completion of the formation and control of the amount of the electrolyte are very important and operation of the formation is difficult since the concentration is higher than that generally employed. Therefore, the formation should be allowed to proceed with repeating the charging and the discharging. For example, when formation of a sealed lead acid storage battery of 12 Ah in capacity is carried out in the battery container, the following steps are taken.

|  | Current (A) | Time (hr) | Capacity (Ah) |
| --- | --- | --- | --- |
| Charging 1 | 3 | 10 | 30 |
| Discharging 1 | 3 | 1 | 3 |
| Charging 2 | 3 | 7 | 21 |
| Charging 3 | 2 | 4 | 8 |
| Discharging 2 | 3 | 3 | 9 |
| Charging 4 | 3 | 4 | 12 |
| Charging 5 | 1 | 12 | 12 |

Total time of such formation is about 40 hours and a quantity of electricity which is about six times the capacity of the battery is introduced into the battery for charging and discharging. During the formation, it is necessary to control the temperature of environment to keep the battery temperature at 20°–50° C. If the battery temperature is low, decrease of the electrolyte is small and the electrolyte remains in the cell after termination of the formation to cause leakage of the electrolyte in actual use. On the other hand, if the battery temperature is high, much decrease of the electrolyte occurs and the current at the time of constant-voltage charging in actual use increases to cause reduction of cycle life.

Finally, the specific gravity of the electrolyte reaches 1.32–1.35 and sodium sulfate, sodium phosphate, sodium tetraborate or the like is added to the electrolyte for improving over-discharging characteristics. These additives are dissolved in the electrolyte before carrying out the formation in the battery container and the electrolyte is poured in the cell chamber.

What is claimed is:

1. A sealed lead acid storage battery comprising a monoblock battery container comprising cell chambers arranged in two parallel rows, groups of electrode plates respectively disposed within each of said cell chambers, electrode poles associated with the groups of electrode plates such that electrode poles of different polarity of adjacent ones of the cell chambers are connected by cell connectors which cross over partitions between the adjacent ones of the cell chambers, and a lid for the container, wherein:

(a) said groups of electrode plates in the cell chambers all comprise one shape type of electrode plates provided in such a manner that positive electrode poles and negative electrode poles at upper parts of the groups of electrode plates are arranged at a common side of cell chambers, in each of the rows of cell chambers, near a central partition between both the rows of cell chambers, and output and input terminals at two end cell chambers are arranged at given positions by tabs connected to the positive electrode pole and the negative electrode pole of the groups of electrode plates disposed in said two end cell chambers; and (b) said cell connectors between the cell chambers cooperatively form a U-shaped line near the partition between both the rows of cell chambers.

2. A sealed lead acid storage battery according to claim 1, wherein a positive electrode pole and negative electrode pole in one pair of adjacent cell chambers and a positive electrode pole and negative electrode pole in another pair of adjacent cell chambers located across said central partition from the one pair of adjacent cell chambers are fixed in one pot which is provided in the inside of the lid for filling an adhesive.

3. A sealed lead acid storage battery comprising a monoblock battery container comprising two parallel rows of cell chambers, groups of electrode plates respectively disposed within each of said cell chambers and electrode poles associated with the groups of electrode plates such that electrode poles of different polarity of adjacent ones of the cell chambers are connected by cell connectors which cross over partitions between the adjacent ones of the cell chambers, wherein:

(a) said groups of electrode plates in the cell chambers all comprise one shape type of electrode plates provided in such a manner that positive electrode poles and negative electrode poles at upper parts of the groups of electrode plates are arranged at a common side of cell chambers, in each of the rows of cell chambers, near a central partition between the rows of cell chambers, and output and input terminals at two end cell chambers are arranged at given positions by tabs connected to a positive electrode pole and a negative electrode pole of the groups of electrode plates disposed in said two end cell chambers;

(b) said cell connectors between the cell chambers cooperatively form a U-shaped line near the central partition between both the rows of cell chambers; and (c) said battery further comprises a lid which covers the battery container, said lid having small projections provided in indented portions provided on the surface of the lid and holes, said tabs being provided on said lid, said poles passing through said holes in the lid, said projections acting to form a space under the tabs when said tabs are placed on the projections, and said tabs being fixed with an adhesive charged in said indented portions.

4. A sealed lead acid storage battery according to claim 3, wherein the tabs are arranged in a direction substantially perpendicular to a direction of the central partition and arranged in the indented portions, and the output and input terminals are provided on a side of the cell chambers opposite to said common side of the cell chambers.

* * * * *